Nov. 30, 1937.  F. H. SHEPARD, JR  2,100,756
ALTERNATING CURRENT CONTROL
Filed Nov. 29, 1935
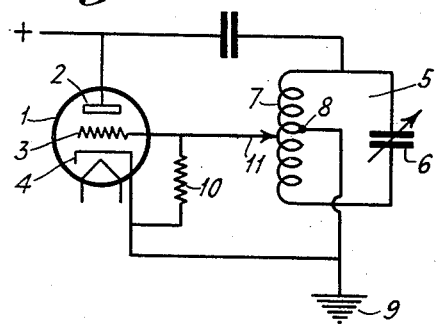
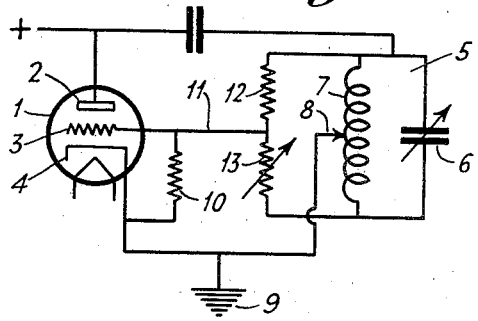
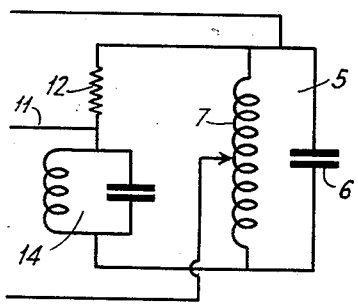
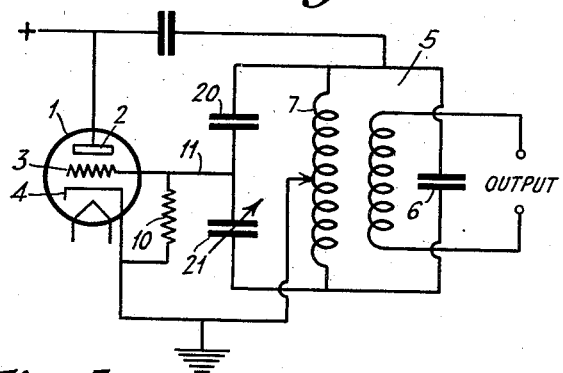
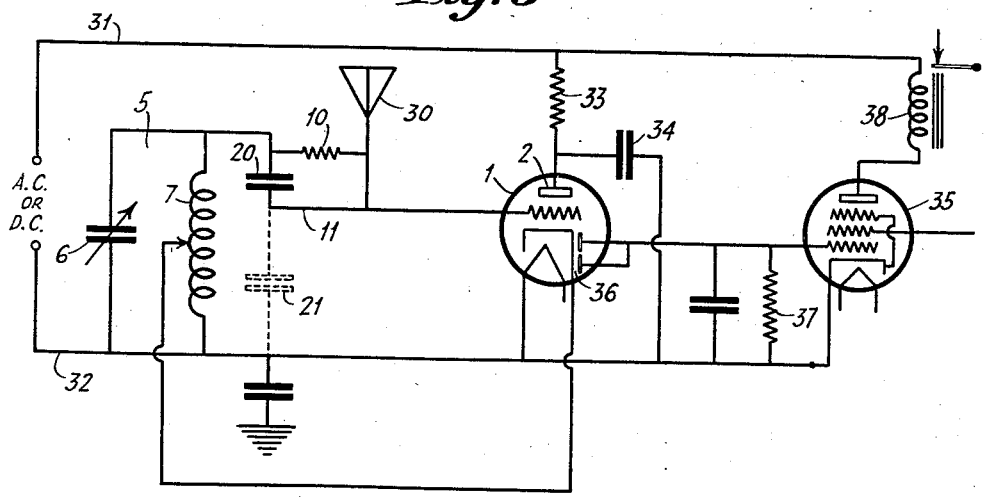
INVENTOR.
FRANCIS H. SHEPARD, JR.
BY Charles McClair
ATTORNEY.

Patented Nov. 30, 1937

2,100,756

UNITED STATES PATENT OFFICE 2,100,756

ALTERNATING CURRENT CONTROL

Francis H. Shepard, Jr., Rutherford, N. J., assignor, by mesne assignments, to Radio Corporation of America, New York, N. Y., a corporation of Delaware Application November 29, 1935, Serial No. 52,015

2 Claims. (Cl. 250—36)

My invention relates to oscillators, particularly to means for controlling the amplitude of oscillations.

The usual electron discharge oscillator comprises a discharge device with the input electrodes coupled to the output electrodes in such a way that alternating current of the operating frequency is fed from the output to the input in the proper phase to sustain oscillations. The usual method of modulating the amplitude of such an oscillator by varying the current or voltage applied to the discharge device requires in some cases considerable power, often necessitating amplification of the modulating energy in auxiliary amplifying units before it is impressed upon the circuits of the oscillator. Further, modulation of the current or voltages applied to the oscillating tube tends to render the tube unstable in operation.

It is an object of my invention to devise a system for controlling directly the amplitude of oscillations of an oscillator by the modulating energy.

It is an object of my invention to modulate alternating current with a minimum expenditure of energy in such a manner that even alternating current of considerable power may be controlled without preamplification of signal energy.

It is a still further object of my invention to construct an electron tube oscillator which is stable in operation and inexpensive to manufacture.

In accordance with my invention the input electrodes and output electrodes of an oscillator are so coupled to the resonant or oscillating tank circuit that the phase of the alternating voltage upon the input electrodes may be readily varied with respect to the alternating voltage on the output electrodes. For example, my invention may be applied to the Hartley or any conventional type of oscillator by connecting the grid to an intermediate point in the resonant or tank circuit, preferably at or near the electrical center of the circuit, where the alternating current potential is zero and by relatively shifting the grid connection with respect to the point of zero alternating potential at the signal frequency. The grid may thus be excited by feed-back alternating potential of varying magnitude which is in-phase or out-of-phase with respect to the anode potential.

The invention, both as to its organization, method of operation and applications, as well as further objects, features and advantages thereof, will be more fully understood by reference to the following description read in connection with the accompanying drawing in which Figure 1 shows diagrammatically one form of oscillator embodying my invention: Figures 2, 3 and 4 show modifications thereof and Figure 5 shows diagrammatically one preferred embodiment of my invention applied to a relay.

Figure 1 shows an embodiment of my invention in an oscillator comprising an electron discharge device 1 with an anode 2, grid 3 and cathode 4. Coupled to the tube is an oscillatory tank circuit 5 comprising a tuning condenser 6 and an inductance 7. As is common in oscillators of this type, the cathode is connected at and near the center of inductance 7 and the anode is coupled through a blocking condenser to one end of the oscillatory tank circuit. While it is immaterial in applicant's device where the system is grounded, a ground connection 9 is arbitrarily shown connected to the cathode which establishes the anode connection at an alternating current potential above ground. A grid leak is shown at 10, the power supply circuits being omitted in the interest of clarity.

The grid connections 11 in accordance with my invention include in this embodiment a sliding contact between the grid lead and inductance 7. Since conditions for oscillations in a thermionic discharge device require that an input or grid electrode be energized by a component of alternating current opposite in phase to the alternating voltage of the output or anode electrode, it is clear that any grid connection below the electrical center (beyond the cathode tap from the anode end) of inductance 7 will supply the grid with an alternating potential of the proper phase to create and sustain oscillations. With the grid connection at the electrical center of the inductance, which in this case is established by the grounded cathode connection, the grid is short circuited to ground to prevent oscillations and a grid connection to any point above the electrical center will supply the grid with an alternating voltage, no component of which is in phase opposition to the anode alternating voltage and hence will prevent self-excited oscillations. The output of the oscillator may be varied by moving the grid connection 11. Moving the grid connection from a position above to a position below the electrical center of coil 7 brings the discharge device 1 into a condition of oscillation, the intensity of oscillation being dependent upon the extent to which the grid connection is displaced from the electrical center of coil 7. The exciting grid voltage must of course be sufficient to overcome the losses in the tube and circuits.

My invention may also be applied, as shown in Figure 2, to an oscillatory system in which a resistance potentiometer, comprising resistors 12 and 13, is connected across the terminal of the oscillatory tank circuit and the common terminal of which is attached to grid 3 through grid connection 11. With equal values of resistance for 12 and 13 the grid is maintained at zero alternating current potential and is connected in effect to the electrical center of the oscillatory circuit inductance. If resistance 13 is decreased in value the alternating potential of the grid connection to the tank circuit is changed in value to below the zero potential of the electrical center of the tank circuit and becomes opposite in phase to that of the plate potential. In this way the grid may be energized by an alternating potential, a component of which is in phase opposition to alternating potentials on the anode to create self-excited oscillations.

As shown in Figure 3, resistance 13 of Figure 2 may be replaced by parallel tuned circuit 14 of such constants that when tuned to the operating frequency will offer an effective resistance equal to that of resistance 12. Upon a variation in the capacity or inductance of circuit 14 it becomes detuned with respect to the operating frequency, its effective resistance decreases and oscillations commence.

In a further modification of my novel circuit arrangement shown diagrammatically in Figure 4, the grid connection is to the mid-point of an impedance potentiometer comprising condensers 20 and 21 connected in series across the terminals of the oscillatory tank circuit 5. With equal values of condensers 20 and 21, grid 3 is effectively connected to the electrical center of the oscillatory tank circuit and is maintained at zero alternating potential with respect to cathode. An increase in capacity of condenser 21 effectively moves the grid connection to a point of potential below the electrical center of the oscillatory circuit to energize the grid with an alternating current potential of the necessary phase opposition and amplitude with respect to the plate alternating potential to create and sustain oscillations. The circuits of Figure 4 may conveniently be applied to a modulating system by replacing condenser 21 with the movable plates of a condenser microphone. Any suitable output circuit may be coupled to alternating current circuits of my improved oscillator.

This circuit arrangement may be conveniently applied to burglar alarm systems, where the plates of condenser 21 are so placed on opposite sides of a door or window that their capacity may be increased and oscillations started by the introduction of the body capacity of a person.

The impedance potentiometer across the terminals of the oscillatory tank circuit may, if desired, comprise the windings of an inductance coil with the grid of the oscillatory connected to some intermediate point on the inductance coil. As in Figures 2, 3 or 4 oscillations may be modulated by varying the relative values of reactance upon the two sides of the grid connection.

Figure 5 shows diagrammatically one embodiment of my invention applied to a capacity operated relay. Here the grid of tube 1 is connected to a mid-point on a condenser potentiometer, which is, as in Figure 4, connected across the terminals of the oscillatory tank circuit. The capacity of condenser 21 in this case is replaced by the capacity between antenna 30 and ground. This embodiment of my invention is particularly adapted to burglar alarm system where antenna 30 may be placed adjacent any door, window or object near which unauthorized persons may approach. A slight variation in the antenna to ground capacity may serve to set the circuits of the discharge device 1 into oscillations.

In this commercial embodiment of my invention the energizing potentials for the discharge device 10 are obtained from lines 31 and 32 which may be connected to a power circuit of direct current or any commercial frequency. The anode of oscillator 1 is connected through resistance 33 to one side of the line and the anode is coupled to the grounded end of the oscillatory tank circuit through condenser 34. The output alternating potential appearing across the lower half of the tuning inductance 7 may be coupled across the input circuit of amplifier 35 in series with the diode 36 to establish a direct current potential across resistor 37 proportional to the amplitude of the generated oscillations. The anode to cathode circuit of amplifier 35 is connected across the power supply lines 31 and 32 through the winding of relay 39, the contact points of which may be connected in any desired alarm or work circuit. In the embodiment shown the control grid of amplifier 35 swings negatively upon the flow of rectified alternating current through resistor 35 and diode 36.

With the oscillator circuit embodying my invention the amplitude of oscillations may be modulated by controlling the amplitude and the phase relation of the alternating voltages on the input electrode of the electron oscillation tube with respect to the alternating voltages on the output electrodes, the amplitude of oscillations being proportional to the displacement of phase and amplitude of the grid voltage. An oscillator constructed in accordance with my invention requires no amplification of the modulating signal, thus adapting my system to inexpensive manufacture. My system is further characterized by its adaptability to power supplies of commercial voltages and frequencies thus eliminating expensive and bulky power supply rectifying units.

To those skilled in the art many modifications of the characteristic features of my invention may be made without departing from the scope thereof. It is accordingly desired that my invention be limited only by the prior art and by the appended claims.

I claim:

1. In combination an oscillator for generating alternating current comprising a tube with an anode, grid cathode, and a heating element in said cathode, an oscillatory tank circuit coupled at one end to ground and to said anode and connected at its electrical center to said cathode, an anode voltage source connected between said anode and said heater, the heater and one side of said source being grounded to alternating current and means for modulating the generated alternating current comprising a condenser potentiometer, including at least one variable capacitor, connected between the terminals of said tank circuit and a connection from said grid to a point intermediate the ends of said condenser potentiometer, said variable capacitor being connected to the grounded end of the tank circuit.

2. In combination, an oscillator comprising an anode, grid, indirectly heated cathode, a heating element insulatingly supported in said cathode, an oscillatory tank circuit connected at one end of said heating element and to ground, said end being coupled for alternating current to said anode, a connection between said cathode and an intermediate point of the inductance of said tank circuit, an anode voltage supply connected between said anode and said heating element, a condenser coupled between the other end of said tank circuit and said grid, and means for controlling oscillations of said oscillator comprising a variable capacitor connected between said grid and ground.

FRANCIS H. SHEPARD, Jr.